Oct. 8, 1929.                J. C. BELDEN                1,731,039
ELECTRIC CONNECTER
Filed May 19, 1927
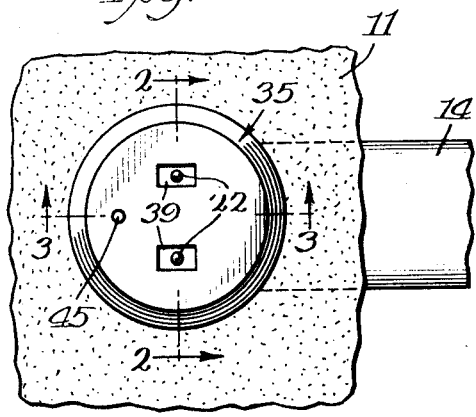
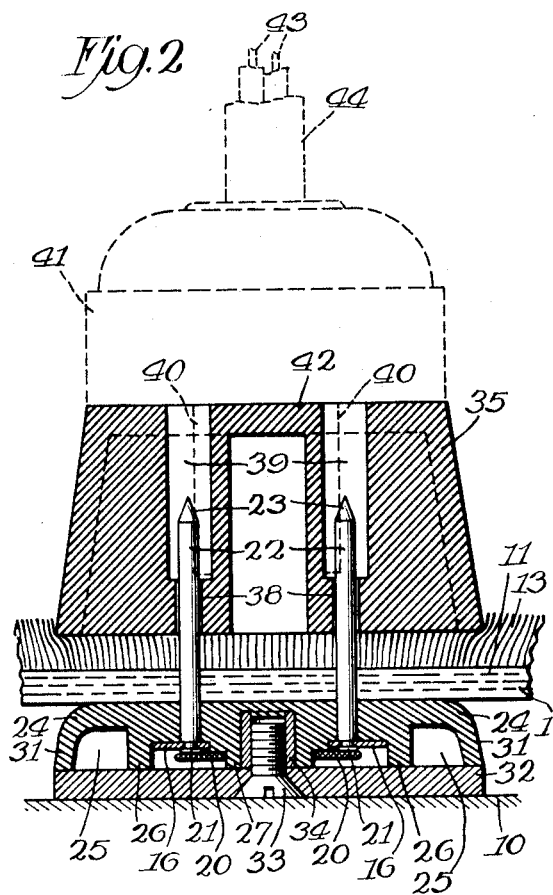
Inventor:
Joseph C. Belden
By Fisher, Towle, Clapp & Adams
Attys.

Patented Oct. 8, 1929

1,731,039

UNITED STATES PATENT OFFICE

JOSEPH C. BELDEN, OF LAKE FOREST, ILLINOIS, ASSIGNOR TO BELDEN MANUFACTURING COMPANY, OF CHICAGO, ILLINOIS, A CORPORATION OF ILLINOIS

ELECTRIC CONNECTER

Application filed May 19, 1927. Serial No. 192,577.

The invention relates to improvements in electric connecters and is of particular service in the case of a connecter used for the purpose of establishing an electric connection through an ordinary floor rug.

Ordinarily rooms are not fitted with outlets in the floor and it is, therefore, necessary to provide some sort of portable or flexible connection between the wall outlet or base-board outlet of the room in order to supply current or to provide an electric circuit for devices of a portable character, for example, portable lamps or table push buttons. Such devices are quite frequently located on the rugs. Under such circumstances the problem of running a lead or conductor to the device above the rug and at the same time eliminating exposed wires or cables with their attendant dangers and other disadvantages, is not simple. If a hole be made in a rug for the purpose of leading out the wire which is run from the wall of the room and is located under the rug, the hole in the rug is unsightly and if the relative location of the rug and the portable device is at any time changed, it may be necessary to make a new hole to serve the new location. Furthermore, the dragging of the rug on the conductor or cable passing therethrough is liable to tear the rug or make an unsightly hole therein.

The principal objects of the present invention are to provide a connecter arrangement so organized that a connection may be made between the wire running under the rug and the wire running above the rug to the device or fixture without the necessity of making any permanent holes in the rug itself; to provide an arrangement so organized that the portable fixture and the coil or conductor serving the same may be disconnected from the wire or cable running under the rug without the necessity of disturbing the latter; to provide an arrangement of the class described which shall be as permanent as is desired while at the same time, it is sufficiently flexible to satisfy all the requirements of separability or movability; to provide a construction which shall be simple and convenient to install and manipulate; to provide a construction which shall be simple and economical in design and manufacture, while being rugged, neat, and efficient in service, and, in general, to provide an improved arrangement of the character referred to.

In the drawings which illustrate a specific application of my invention suitable for floor lamp use, Fig. 1 is a plan view of a portion of a floor rug showing in place what may be styled the permanent parts of the structure.

Fig. 2 is a section taken on the line 2—2 of Fig. 1 and showing in dotted lines a male plug removably applied thereto.

Fig. 3 is a section taken on the line 3—3 of Fig. 1.

Fig. 4 is an underside plan of the base member with cap or cover removed.

Fig. 5 is a section taken on the line 5—5 of Fig. 4, and

Fig. 6 is a perspective view of one of the floor cord terminals with prong and conductor attached.

Referring to the drawings, 10 represents the floor of the room and 11 is the rug, the numeral 12 representing the foundation of the rug and 13 the nap thereof. The floor wire, i. e. the cord or cable which runs over the surface of the floor under the rug to the point where the connection is to be used, is of special character as disclosed in my copending application, Ser. No. 145,403, and comprises a single strip of rubber 14 in which there are molded in the course of manufacture, a pair of electrical conductors 15. Said conductors 15 preferably take the form of flexible braided copper members rolled out flat as shown so that the strip or body of rubber 14 may be made as thin as possible.

To each of the conductors 15, there is fitted or connected a terminal member 16. Said connection may conveniently be made by slotting the terminal plate 16 as shown at 17 and 18 to form a lateral extending tongue 19 so that the bared end 20 of the conductor 15 may be threaded through the slots 17 and 18 and clamped permanently in place by bending down the tongue 19 thereupon.

To one end of each of the terminals 16, there is rigidly secured as by riveting 21, an upstanding prong element 22 which takes the form of a slender brass rod pointed at its upper end as shown at 23 so that it may readily be forced through the rug without the necessity of first making an aperture in the rug.

The two terminal plates 16 are mounted permanently in a circular flat relatively thin base element 24, which may be made of molded Bakelite or analogous material. The upper side of the base element 24 is smooth and flat except for the prongs 22 which project through suitably spaced vertical apertures in said base. Said base element 24, although hollowed out at the bottom as shown for example at 25, is made with bosses or lugs 26, 27, 28 and ribs 29 and 30, the ends of which are flush with the underside of the rim or skirt 31 of the base. Between the lugs 26 and the center boss 27, the material of the base 24 is cut away to accommodate and fit the terminals 16, thereby positioning the same in the base. The boss 28 also serves to space the ends of the terminals 16 to which the conductor wires are attached.

It will be observed that the prongs 22 are riveted into the terminals 16 at the proper location to register with the apertures in the base through which said prongs 22 pass. The rim or skirt 31 of the base at one side is cut away in order to accommodate the conductor strip 14 and in order to hold and clamp the same in place and also for the purpose of covering the live terminals 16, a sealing cap or disk 32 of the same diameter as the base 24 is employed. Said sealing disk 32 is secured to the base by a central flat head machine screw 33 which enters a correspondingly threaded metal insert 34 which is molded into the central boss 27 of the base when the latter is being formed or manufactured.

The prongs 22 of the base, which pierce the rug and project up beyond the top surface of the rug for a substantial distance, extend into a socket member designated as a whole 35. Said socket member 35 is also constructed of a single piece of molded Bakelite or analogous material, and is preferably of approximately the same diameter as the base member 24. In order to save Bakelite, cavities such as 36 and 37 are formed in the underside of the socket member 35 and of course suitable apertures as at 38 are made in the bottom of the socket 35 in order to admit the prongs 22. Said apertures 38 are of size to fit the prongs 22 only for a short distance from the lower surface of the socket 35, the upper portions of said apertures 38 being enlarged and made of rectangular shape as shown at 39. The needles 22 are spaced the proper distance apart so that when the prongs 40 of an ordinary male connecter 41 are thrust into the apertures 39, the prongs 40 being guided by the central portion 42 of the socket 35, will slide between the ends of the needles forcing the latter apart slightly and thus establishing an efficient electrical connection between the conductors 15 of the cord 14 and the conductors 43 of the cord 44 which leads to the fixture or device which is to be served by the arrangement.

In order to secure the socket 35 more or less permanently in position, and thus to obviate danger of the needles 22 becoming exposed and subject to short circuit, means are provided to clamp or secure the socket 35 to the base 24. Such means comprise in the present instance, an additional needle or prong 45 projecting upwardly from the base 24 and through the rug, being secured in the base by a head 46 on the lower end of the prong or pin 45. The upper part of the said pin 45 extends into a vertical aperture 47 in the socket 35 in which socket there is threaded a suitably located axially horizontal set screw 48 which may be tightened to engage the side of the upper portion of said pin 45 and thereby lock the socket 35 to the base 24.

The contact needles 22 and the lock pin 45 are made with sharp points and sufficiently slender so that when they are forced through the rug, the rug will not be damaged in any way, and when the connection is shifted to some other location, the holes made by the said needles will not be noticed, also since the connecter is not in any way secured to the floor, any movement of the rug relative to the floor will cause a corresponding movement of the connecter and the needles will not tear or enlarge the small openings in the rug through which the needles pass. When the male connecter 14 which supplies the fixture or other device is separated or detached from the connecter, the socket 35 will remain in place ready for use whenever it is desired to re-connect the device by re-inserting the male connecter plug 41 so that it is a simple matter to disconnect and remove the lamp or other device, whenever desired.

The described details of construction being illustrative of only a single application of my invention, it will be understood that the scope of same should be determined by reference to the appended claims, said claims being construed as broadly as possible, consistent with the state of the art.

I claim as my invention:

1. In combination, an electric conductor arranged to be interposed between the floor of a room and the rug resting thereon, an insulating base member also so interposed and movable on the floor, a terminal on said base and to which said conductor is connected, a two-part insulating member located above the rug, one of said parts being adjustably connected to the base and constituting, with the base, a clamp for the rug, a conductor mounted in the other part and provided with a terminal, and a metal prong element on one of said terminals sharp enough to pierce the rug and serving as an electric connection between said terminals.

2. In combination, an electric conductor arranged to be interposed between the floor of a room and the rug resting thereon, an insulating base member also so interposed and movable on the floor, a terminal on said base and to which said conductor is connected, a two-part insulating member located above the rug, one of said parts being adjustably connected to the base to constitute a clamp for the rug, a conductor mounted in the other part and provided with a terminal, and a metal prong element on one of said terminals sharp enough to pierce the rug and serving as an electric connection between said terminals, the other part of said two-part member being readily separable from the clamp part of the structure for the purpose of breaking the electric connection.

3. In combination, a supply conductor interposed between a floor and a rug thereon, a base member also interposed and movable on the floor, a terminal on said base to which said conductor is electrically connected, a contact prong electrically connected to said terminal, extending upwardly therefrom and through said rug, a socket member having an aperture extending therethrough, said socket member being adapted to be positioned over said base with the rug interposed therebetween, and with said contact prong entering the lower end of said aperture, the upper end of said aperture being adapted to receive a contact prong of a male connecter plug and to effect separable electric connection between such prong and said upwardly-extending prong within said aperture.

Date May 13, 1927.

JOSEPH C. BELDEN.